Aug. 23, 1949.    A. F. HICKMAN    2,479,572
SPRING SUSPENSION FOR TANDEM AXLES
Filed Nov. 6, 1946    3 Sheets-Sheet 1
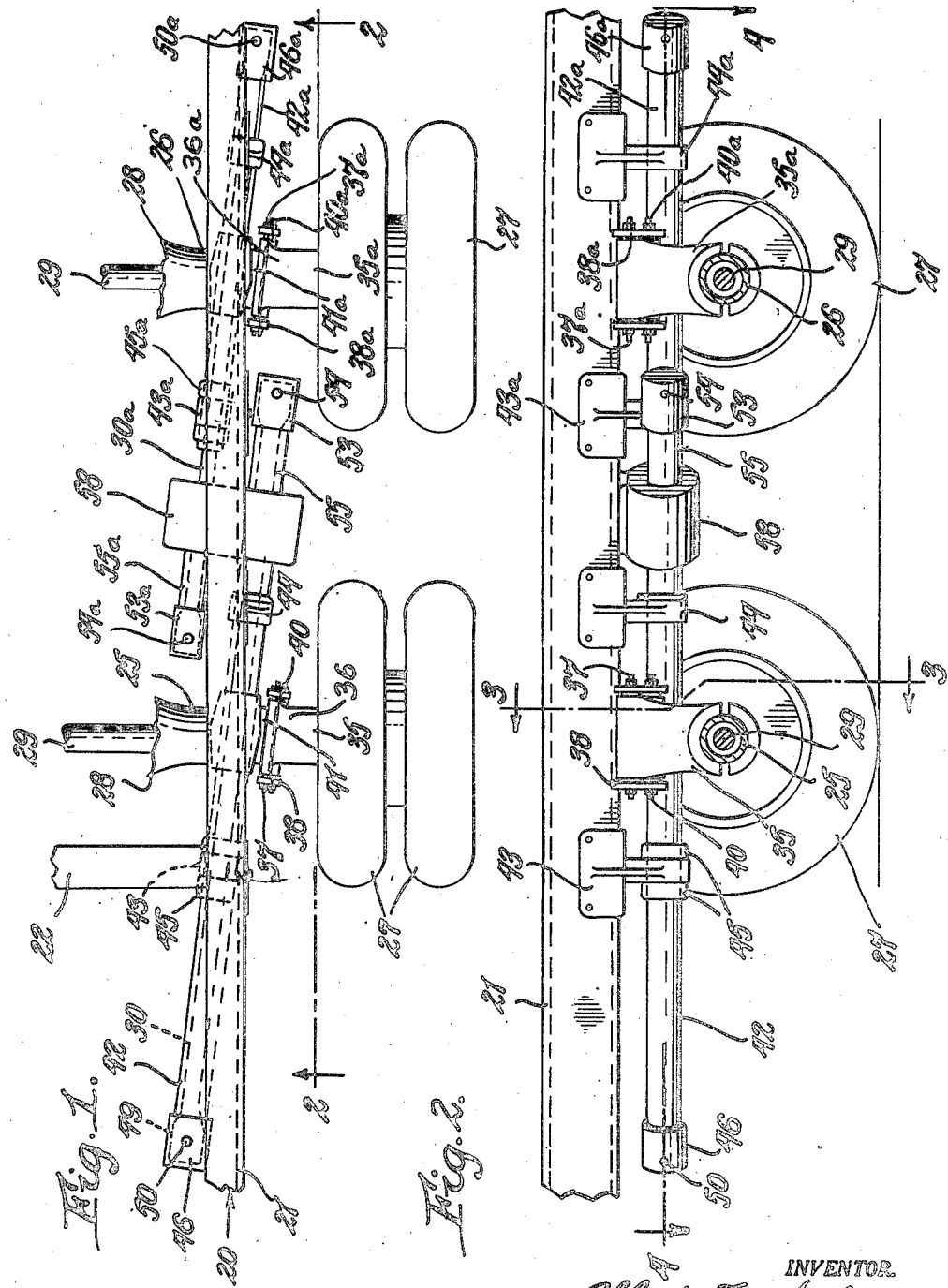
INVENTOR
Albert F. Hickman
BY
Popp and Popp
ATTORNEYS

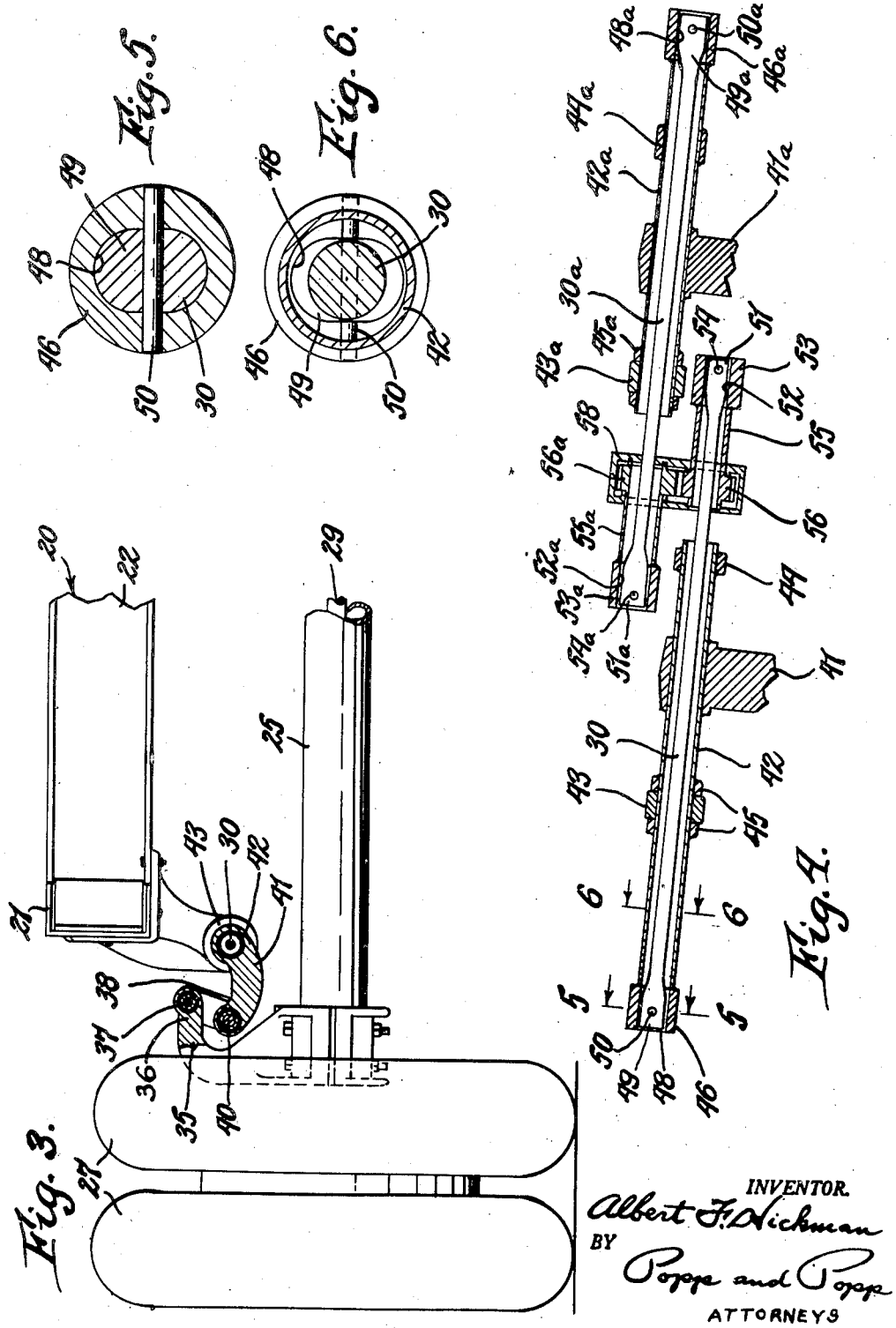

Aug. 23, 1949.   A. F. HICKMAN   2,479,572
SPRING SUSPENSION FOR TANDEM AXLES
Filed Nov. 6, 1946   3 Sheets-Sheet 3
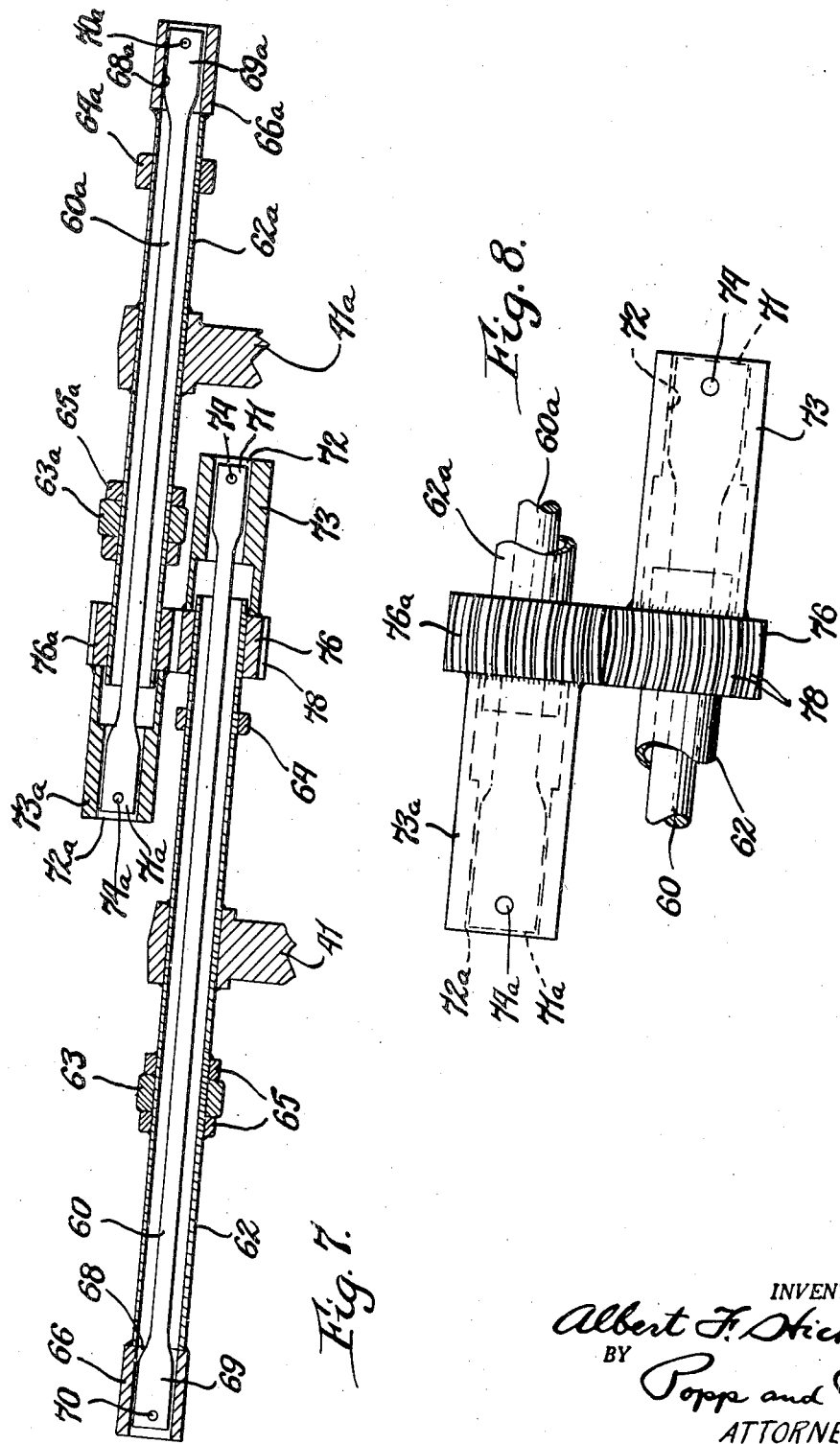
INVENTOR.
Albert F. Hickman
BY Popp and Popp
ATTORNEYS.

Patented Aug. 23, 1949

2,479,572

UNITED STATES PATENT OFFICE 2,479,572

SPRING SUSPENSION FOR TANDEM AXLES

Albert F. Hickman, Eden, N. Y., assignor to Hickman Industries, Inc., Eden, N. Y., a corporation of New York Application November 6, 1946, Serial No. 708,121

3 Claims. (Cl. 280—104.5)

This invention relates to a spring suspension for tandem axles in which each axle is permitted to move against a geometric resilient resistance both laterally and longitudinally, relative to the vehicle frame, both when the vehicle has a low percentage of load variation and also when it has a high percentage of load variation.

The invention is particularly directed to the form of torsion rod tandem axle forming the subject of my Patent No. 2,333,650, dated November 9, 1943, and while it is more particularly described in connection with a highway vehicle, it is also applicable for use on other land vehicles, such as railroad cars.

In common with my said patent important objects of the present invention are to provide a spring suspension (1) which will function to safely support the vehicle body at high speeds, both when loaded and unloaded; (2) which reduces and cushions both the vertical and lateral impacts from the axle against the body of the vehicle, both when the vehicle is loaded and unloaded and without imposing undue end thrusts on the pivotal connections which connect the axles to the body; (3) in which torsion rods are employed to provide a longer and variable spring resistance range; (4) in which geometric resilient resistance is obtained in a compact structure which requires no lubrication and is free from the squeaks incident to the use of leaf springs; (5) in which the distribution of the load to the body is at a plurality of spaced points; (6) in which side sway is reduced to any desired amount; (7) in which periodic vibration of the suspension is damped out and in which wheel tramp is avoided; (8) in which all forces are cushioned so as to increase gasolene mileage and tire wear; (9) which has light unsprung weight; (10) in which the metal stresses are within safe working limits of heat treated castings or forgings; (11) which can be produced at low cost and in particular requires only simple machining operations; (12) in which the parts are arranged inside the wheels and in which the parts are arranged close to the wheels to provide high and wide pivot positions and increased stability; (13) which can easily be taken down and repaired; (14) in which any desired frequency or degree of spring deflection can be obtained; (15) in which auxiliary devices for the control of side sway are rendered unnecessary; (16) in which one or both of the tandem axles are self-steering so that when rounding a curve, said tandem axles are caused to assume such an angle relative to each other as will enable a pure rolling action to be obtained; (17) which includes compensating means connecting the companion ends of the tandem axles and through which the excess load on either axle is transmitted to the other axle; (18) in which said compensating means is in the form of a simple transmission connecting the normally "dead" ends of the torsion rod springs so that the excess stress on either torsion rod is transmitted to the other to transmit the load from one axle to the other; (19) in which the transfer of the load from the tandem axles to the front axle of the vehicle, under braking reaction, is identical with the similar transfer of the load in a two-axle vehicle of the same wheelbase, weight and load; and (20) which will stand up under conditions of severe and constant use with very little servicing.

A specific object of the present invention is to provide such a tandem axle suspension in which all connections to the frame are in closely spaced relation to each other thereby to reduce to a minimum any distortion of the suspension through weaving of the frame.

Another specific object is to provide such a tandem axle suspension in which all connections to the frame are made to the longitudinal side bars thereof to simplify application of the suspension and design of the frame and suspension and to further reduce the effect of weaving of the frame upon the suspension.

Another specific object is to arrange the gears connecting the normally "dead" ends of the torsion rods between the axles to provide greater compactness and accessibility.

Another specific object is to simplify the construction and mounting of the parts of the spring suspension as compared with that shown in my said patent.

Another specific object is to provide a form of the invention in which a separate mounting for the gears connecting the normally "dead" ends of the torsion rods is eliminated and in which the entire housing or gear case for these gears can also be eliminated.

Other specific objects and advantages will appear from the following description and accompanying drawings in which:

Fig. 1 is a fragmentary top plan view of a tandem axle spring suspension embodying my invention.

Fig. 2 is a vertical longitudinal section thereof, taken on line 2—2, Fig. 1.

Fig. 3 is an enlarged fragmentary transverse section thereof, taken generally on line 3—3, Fig. 2.

Fig. 4 is a fragmentary horizontal section taken on line 4—4, Fig. 2, looking downwardly.

Figs. 5 and 6 are enlarged vertical sections taken on the correspondingly numbered lines on Fig. 4.

Fig. 7 is a view similar to Fig. 4 and showing a modified form of the invention.

Fig. 8 is an enlarged fragmentary top plan view of the gearing showing in Fig. 7.

The invention is shown in connection with a highway vehicle, although the invention is also applicable to railroad cars or other land vehicles. The frame 20 of the vehicle is shown as including a pair of main longitudinal side frame bars 21 suitably joined together transversely by cross frame bars 22 in the usual and well-known manner.

This frame is shown as supported by a pair of tandem axles 25 and 26 which are supported by wheels 27, these wheels being rotatably secured to the axles. One or both pairs of wheels can be drive wheels, both axles being shown as provided for this purpose with a differential housing 28 through which power is transmitted to the drive axle shafts 29 housed within the axles 25, 26 and which are secured to the wheels 27 in the usual and well-known manner.

Each end of the front tandem axle 25 is resiliently connected to the frame through a torsion rod 30 and each end of the rear tandem axle 26 is resiliently connected to the frame through a torsion rod 30a, these torsion rods being identical except that the torsion rod 30 is longer than the torsion rod 30a. The means for pivotally connecting each end of each axle with the frame and with the companion torsion rod 30 or 30a are similar in construction and hence the following description will be deemed to apply to all four of these pivotal connecting means, the corresponding parts of these pivotal connections for the rear axle being distinguished by the suffix "a."

To each end of each axle is secured an axle bracket 35 which is fast to the axle and extends upwardly therefrom and is formed to provide an inwardly projecting arm or horn 36 at its upper end. At its inner upper extremity this axle bracket 35 pivotally carries an axle pivot pin 37 which can be journaled therein in any suitable manner. Referring to Fig. 1, it will be noted that the axle pivot pins 37 slant forwardly and inwardly relative to the longitudinal axis of the frame 20, or in other words, the axle pivot pins 37, 37a for each axle "toe in." This arrangement of these axle pivot pins 37, together with the corresponding arrangement of the other pivotal connections, as hereinafter described, renders the axles self-steering in rounding curves.

The opposite ends of each axle pivot pin 37 are connected by shackles 38 to the opposite ends of a crank arm pivot pin 40, this crank arm pivot pin 40 being journaled in the outer end of a crank arm 41. This crank arm 41 is fast to the central part of a torsion tube 42, the torsional yield of which adds to the yielding resistance provided by the torsion rod which it surrounds. This torsion tube 42 is journaled in a pair of bearings 43 and 44 which are secured directly to the main longitudinal side frame bar 21 as best shown in Figs. 2 and 3. The bearing 43 is shown as somewhat larger than the bearing 44 and flanked by a pair of thrust collars 45 welded to the torsion tube so that the bearing 43 serves as a thrust bearing to prevent longitudinal displacement of the torsion tube 42.

A cylindrical socket member 46 is shown as welded to that end of the torsion tube remote from the axles 25, 26. This socket member is provided with a bore 48 which, as best shown in Figs. 5 and 6, is oval in cross section to receive the enlarged ovalled live end 49 of the torsion rod 30. The oval bore 48 and ovalled live end 49 are preferably formed in the manner set forth in my Patent No. 2,213,004, granted August 27, 1940, for Torsion rod mounting. For the purpose of facilitating assembly and preventing endwise sliding of the torsion rod, a pin 50 is also shown as extending through the socket member 46 and the ovalled end 49 of the torsion rod therein.

The opposite end 51 of the torsion rod 30 is similarly enlarged and ovalled and is fitted in the ovalled bore 52 of a socket member 53, a locating pin 54 extending through this torsion rod end and the socket member 53 to facilitate assembly and to hold the torsion rod against endwise displacement. This socket member is shown as welded to the far end of a tubular hub 55 of a gear 56 through which the torsion rod extends. The two gears 56, 56a are of the same size and interengage to transmit motion from one torsion rod to the other. These gears 56, 56a are arranged in a gear box 58 which is secured to the same main longitudinal side frame bar 21 as the bearings 43 and 44 for the torsion tubes and torsion rods which these gears interconnect. The hubs 55, 55a for these two gears can be journaled in the side walls of the gear box in any suitable manner. It will be particularly noted that the gear box 58 is located between the two axles and is secured to the same main longitudinal frame side bar 21 as the torsion rods for the corresponding ends of the axles. It will also be noted that the axes of the torsion rods 30, 30a, torsion tubes 42, 42a, and crank arm pivot pins 40, 40a are parallel with the axes of the axle pivot pins 37, 37a, which, as previously stated, "toe in" or incline forwardly and inwardly relative to the longitudinal axis of the vehicle.

In the operation of the suspension the upward movement of one end of, say, the front axle 25, through its shackles 38, swings the outer end of its crank arm 41 upwardly. This rotates the torsion tube 42, to which this crank arm is fixed, in its bearings 43, 44 on the main longitudinal side frame bar 21. Since the forward extremity of live end 49 of the torsion rod 30 is connected through the oval bored socket member 46 with this torsion tube 42, this rotation of this torsion tube imparts a twisting or torsional movement to this live end 49 of the torsion rod 30.

This torque of the torsion rod 30 is transmitted through the socket member 53 to the corresponding gear 56 through its tubular hub 55 which also houses the torsion rod 30. This gear 56 is thereby rotated and rotates its companion gear 56a in the gear box 58. The tubular hub 55a of this gear 56a houses the so-called "dead" end 51a of the torsion rod 30a and is connected therewith through the socket member 53a. Hence the torque of the torsion rod 30 is transmitted through the transmission formed by the gears 56, 56a to the torsion rod 30a.

This twisting of the torsion rod 30a, through the socket member 46a and torsion tube 42a, tends to force the crank arm 41a fast to this torsion tube downwardly, this torsion tube 41a being free to swing in its bearings 43a, 44a. This downward force imposed upon the crank arm 41a for the rear axle 26 is transmitted through its shackles 38a directly to the corresponding end of the rear axle 26.

It will therefore be seen that the torsion rods 30, 30a, having their normally "dead" ends interconnected through the gears 56, 56a, provide axle compensation, that is, the transfer of the load from one of the tandem axles to the other, thereby to secure a distribution of the load between the tandem axles. At the same time, the torsion rods 30, 30a are selected so as to be capable of twisting to provide the necessary resilient connection between the tandem axles 25, 26 and the frame 20 of the vehicle.

It will be noted that the shackles 38 are inclined upwardly and inwardly from the crank arm pivot pins 40 to the axle pivot pins 37. This upward and inward inclined arrangement of the shackles tends to cause each axle to centralize itself in a direction transverse of the frame and enables the action of gravity to geometrically and resiliently resist any such movement of either axle away from its central position. This permits the vehicle frame 20 to move substantially straight ahead despite a certain amount of lateral movement of the axles. This arrangement of the shackles further provides high and wide pivot positions which provide increased stability in that these high and wide pivot positions provide effective spring centers which can be as wide or wider than the track of the vehicle. Further, this arrangement reduces sidesway, the high and wide pivot positions, together with the upward and inward slant of the shackles, providing a suspension in which the frame 20 is more nearly suspended than mounted. Other important advantages which flow from the inclined arrangement of the shackles as shown are the reduction in the possibility of wheel tramp and in the elimination of the need for anti-body-roll devices, such as torsion bar stabilizers.

When the vehicle is traveling straight ahead, if the tandem axles 25, 26 are not parallel for any reason, they will automatically assume a parallel position because of the fact that if, for example, the rear axle 26 is out of line it will tend to follow a horizontal arc and this tendency, due to the lateral friction between the tires and the roadway, will cause a lateral movement of the axle relatively to the frame. Due to the fact that the shackles 38 normally extend upwardly and inwardly and also due to the fact that the axes of the axle pivot pins 37, 37a, crank arm pivot pins 40, 40a and torsion rods incline forwardly and inwardly or "toe in" as shown in Fig. 1, this lateral movement is automatically caused to be translated into a slight turning movement of the whole axle, and this turning movement will continue until both the tandem axles are in line with each other. Such a movement, naturally, causes a change in the angularity of the shackles 38 at the opposite ends of each axle and this change is resisted by gravity which, due to the obliquity of the shackles, is caused to act in a geometric manner.

The fact that the tandem axles 25, 26 "trail" each other also occurs when the vehicle is making a turn on the road. In this case, just as when going straight ahead, the tires naturally tend to resist lateral scuffing and tend to push the axle laterally and, as a consequence, the whole axle moves obliquely to eliminate this scuffing. Thus, when the vehicle is making a turn, the tandem axles are caused to automatically move to such oblique position relative to each other as will cause their axes to intersect the axes of rotation of the two front or steering wheels of the vehicle and will enable the vehicle to make the turn without tire scuffing. This action occurs when either the vehicle is steered around a long turn in the road or if it is steered sharply on a straight road, as for instance, when overtaking a slow vehicle ahead, or otherwise avoiding some obstruction. It will also be seen that this action takes place to some extent when a tendency to tire scuffing occurs because of one wheel or a pair of wheels at one end of an axle having a diameter different from the diameter of the wheel or pair of wheels at the other end of the same axle.

It will also be seen that by arranging the axes of the torsion rods 30, 30a, the crank arm pivot pins 40 and the axle pivot pins 37 to so "toe in," the torsion rods 30 and 30a are brought out of alinement with each other and into side by side relation in a horizontal plane. This permits the normally "dead" ends of these torsion rods to be interconnected by the compensating transmission in the manner shown.

The form of the invention shown in Figs. 7 and 8 is adapted to interconnect the crank arms 41, 41a of the front and rear tandem axles, respectively, with each other and with the frame to operate in the same manner as with the form of the invention shown in Figs. 1–6, and, as with the form of the invention shown in Figs. 1–6, the same reference numerals and description have been applied to the corresponding suspension parts for the front and rear tandem axles, the parts associated with the rear tandem axle being distinguished by the suffix "a."

As with the form of the invention shown in Figs. 1–6, the resilient resistance is principally provided by a pair of torsion rods 60, 60a, the torsion rod 60 being connected with the corresponding crank arm 41 by a torsion tube 62, the torsional yield of which adds to the yielding resistance provided by the torsion rod which it surrounds. The torsion tube 62 is journaled in a pair of bearings 63 and 64 which are secured directly to the main longitudinal side frame bar 20 of the chassis in the same manner as with the bearings 43 and 44 in the form of the invention shown in Figs. 1–6. The bearing 63 is shown as being somewhat larger than the bearing 64 and flanked by a pair of thrust collars 65 welded to the torsion tube so that the bearing 63 serves as a thrust bearing to prevent longitudinal displacement of the torsion tube 62.

A cylindrical socket member 66 is shown as welded to that end of the torsion tube 62 outside of the axles 25, 26. This socket member is provided with a bore 68 which is oval in cross section to receive the enlarged ovalled live end 69 of the torsion rod 60. The oval bore 68 and ovalled live end 69 are preferably formed in the manner set forth in my said Patent No. 2,213,004. For the purpose of facilitating assembly and preventing endwise sliding of the torsion rod 60, a pin 70 is also shown as extending through the socket member 66 and oval live end 69 of the torsion rod therein. The opposite end 71 of the torsion rod 60 is similarly enlarged and ovalled and is fitted in the ovalled bore 72 of a socket member 73, a locating pin 74 extending through this torsion rod end and the socket member 73 to facilitate assembly and to hold the socket member 73 against endwise displacement. This socket member is shown as welded to the side of a gear 76 so as to form a hub therefor, the torsion rod 60 extending through this gear into the ovalled bore 72 of the socket member 73. The gear 76, for the front tandem axle and the corresponding gear, 76a for the rear tandem axle are of the same size and interengage to transmit motion from one torsion rod to the other. These gears are also provided with curved teeth 78 which are shaped to permit a limited axial misalinement of the gears so that if such misalinement occurs, motion will be properly transmitted from one gear to the other without danger to the teeth.

A feature of the form of the invention shown in Figs. 7 and 8 is the elimination of the gear box or other means to support these gears from the vehicle frame. Instead, on the form of the invention shown in Figs. 7 and 8, the adjacent ends of the torsion tubes 62, 62a are extended to overlap each other and these gears 76 are journaled directly on these overlapped ends of these torsion tubes. Also in this form of the invention the gears 76, 76a are shown as being unhoused.

It will be seen that the operation of the form of the invention shown in Figs. 7 and 8 is substantially similar to the form of the invention shown in Figs. 1–6. Thus, the upward movement of, say, the front axle 25, swings the outer end of its crank arm 41 upwardly. This rotates the torsion tube 62, to which the crank arm is fixed, in its bearings 63, 64. Since the forward extremity of the live end 69 of the torsion rod 60 is connected through the oval bored socket member 66 with this torsion tube 62, this rotation of this torsion tube imparts a twisting or torsion movement to this live end 69 of the torsion rod 60. This torque of the torsion rod 60 is transmitted through the socket member 73 to the corresponding gear 76. This gear 76 is thereby rotated around its bearing on the projecting end of the torsion tube 62 and rotates its companion gear 76a which is journaled on the projecting end of the torsion tube 62a. The tubular hub 73a of this gear 76a is connected with the socalled "dead" end 71a of the torsion rod 60a. Hence the torque of the torsion rod 60 is transmitted through the transmission formed by the gears 76, 76a, to the torsion rod 60a.

This twisting of the torsion rod 60a, through the socket member 66a and torsion tube 62a, tends to force the crank arm 41a fast to this torsion tube downwardly, this torsion tube being free to oscillate in its bearings 63a, 64a. This downward force imposed upon the crank arm 41a for the rear axle 26 is transmitted to this rear axle in the same manner as with the form of the invention shown in Figs. 1–6.

It will therefore be seen that the torsion rods 60, 60a having their normally "dead" ends interconnected through the gears 76, 76a, provide axial compensation, that is, the transfer of the load from one of the tandem axles to the other thereby to secure a distribution of the load between the tandem axles. It will further be seen that no gear box is provided for the gears 76, 76a, these gears being merely journaled on the overlapping ends of the torsion tubes 62, 62a, thus substantially reducing the cost of the suspension as compared with the form of the invention shown in Figs. 1–6. Also it will be understood that the form of the invention shown in Figs. 7 and 8 is only applicable to lighter cars.

From the foregoing it will be seen that all connections of the suspension to the frame are made to the main longitudinal side bar 21 thereof to reduce the effect of any frame weaving on the suspension and that the suspension is balanced and compact and achieves the stated objects in a simple and inexpensive construction.

I claim:

1. A tandem axle vehicle spring suspension, between a vehicle frame and a pair of tandem axles having wheels journaled thereon, comprising a pair of torsion rods journaled on each side of said frame to extend lengthwise of said frame in spaced substantially parallel relation, means operatively connecting the remote ends of each pair of torsion rods separately to the adjacent axle ends, a pair of intermeshing gears on each side of said vehicle intermediate said axles and having tubular hubs, said hubs being extended from said gears in opposite directions from each other and each housing a corresponding one of said torsion rods, and means connecting the housed extremity of each torsion rod to the extended end of its enclosing hub thereby to transmit opposite rotary movement from one torsion rod to the other to effect a compensating load transfer from each end of each axle to the adjacent end of its companion axle when said axles are subject to the different loads.

2. A tandem axle vehicle spring suspension between a vehicle frame and a pair of tandem axles having wheels journaled thereon, a tube fulcrumed on said frame adjacent each end of each of said axles to swing about horizontal axes extending transversely of said axles, a lever fast to each of said tubes and normally extending horizontally therefrom, means operatively connecting the outer end of each lever with the adjacent axle end, a torsion rod arranged in each of said tubes, means securing the remote ends of the torsion rods at each side of said vehicle to the remote ends of said tubes, a gear box secured intermediate said axles to said frame on each side of said vehicle, a pair of intermeshing gears in each gear box and having tubular hubs journaled therein, said hubs being extended from said gears in opposite directions from each other and each housing a corresponding one of said torsion rods, and means connecting the housed extremity of each torsion rod to the extended end of the enclosing hub thereby to transmit opposite rotary movement from one torsion rod to the other to effect a compensating load transfer from each end of each axle to the adjacent end of its companion axle when said axles are subject to different loads.

3. A tandem axle vehicle spring suspension between a vehicle frame and a pair of tandem axles having wheels journaled thereon, comprising a tube fulcrumed on said frame adjacent each end of each of said axles to swing about horizontal axes extending transversely of said axles, a lever fast to each of said tubes and normally extending horizontally therefrom, means operatively connecting the outer end of each lever with the adjacent axle end, a torsion rod arranged in each of said tubes, means securing the remote ends of the torsion rods at each side of the vehicle to the remote ends of said tubes, the adjacent ends of said tubes at each side of said vehicle being arranged alongside each other, a pair of intermeshing gears on each side of said vehicle and each journaled on a corresponding one of said adjacent ends of said tubes, and means operatively connecting the adjacent ends of the torsion rods at each side of said vehicle separately to the hubs of said gears to transmit opposite rotary movement from one torsion rod to the other thereby to effect a compensating load transfer from each end of each axle to the adjacent end of its companion axle when said axles are subject to different loads.

ALBERT F. HICKMAN.

REFERENCES CITED

The following references are of record in the file of this patent:

UNITED STATES PATENTS

| Number | Name | Date |
|---|---|---|
| 2,428,160 | Holmstrom | Sept. 30, 1947 |